United States Patent [19]

Fujimoto et al.

[11] Patent Number: 4,603,077
[45] Date of Patent: Jul. 29, 1986

[54] WATER-ABSORBING LAMINATE AND PRODUCTION PROCESS THEREOF

[75] Inventors: Yoshimasa Fujimoto, Hamamatsu; Hirotoshi Miyazaki, Ibaraki, both of Japan

[73] Assignees: Mitsui Petrochemical Industries, Ltd.; Tokyo Serofan Co., Ltd., both of Tokyo, Japan

[21] Appl. No.: 718,979

[22] Filed: Apr. 2, 1985

[30] Foreign Application Priority Data

Apr. 3, 1984 [JP] Japan .................................. 59-67087

[51] Int. Cl.⁴ ...................... A01G 9/24; A01G 13/02; D04H 1/64
[52] U.S. Cl. .................................. 428/289; 47/17; 47/26; 47/28 R; 156/246; 428/500; 428/507; 428/515; 428/520; 428/913
[58] Field of Search .............. 47/17, 26, 28; 428/289, 428/913; 604/376, 378; 156/246

[56] References Cited

U.S. PATENT DOCUMENTS

| | | | |
|---|---|---|---|
| 3,686,024 | 8/1972 | Nankee . | |
| 4,387,533 | 6/1983 | Green et al. | 47/17 |
| 4,406,660 | 9/1983 | Beiner et al. | 604/376 |
| 4,413,995 | 11/1983 | Korpman | 428/289 |

Primary Examiner—James C. Cannon

Attorney, Agent, or Firm—Armstrong, Nikaido, Marmelstein & Kubovcik

[57] ABSTRACT

A water-absorbing laminate comprising a water-absorbing film and a non-woven fabric, in which the water-absorbing film is formed by film-forming a mixture of (A) a water-soluble polymer containing, as the monomer component, at least 40 mole % of an $\alpha,\beta$-unsaturated compound containing one or two carboxyl groups or groups from which a carboxyl group can be easily derived and in which 5% to 50% of the carboxyl groups and/or groups from which a carboxyl group can be easily derived are in the form of a salt, and (B) polyvinyl alcohol in a weight ratio of (A)/(B) of not less than 1/99 to less than 1/9. This water-absorbing can be produced by laminating the water-absorbing film on the non-woven fabric under pressure either in a hydrous and heat-softened state of the film or through an adhesive and, optionally, heat-treating the resultant laminate.

This water-absorbing laminate can avoid the formation of excessive moisture and prevent waterdrops from dropping while keeping the heat-retaining properties, when used as a sheet for a cover culture. As a result, the occurrence of disease in the plants under culture and any reduction in the yield and quality of the plants are effectively prevented.

8 Claims, 1 Drawing Figure

WATER-ABSORBING LAMINATE AND PRODUCTION PROCESS THEREOF

BACKGROUND OF THE INVENTION

1. Field of the Invention

The present invention relates to a water-absorbing laminate and a process for producing the same. More specifically, it relates to a water-absorbing laminate which can be used as a sheet for a cover culture (or shade culture) or the like and a process for producing the same.

2. Description of the Related Art

Plastic films which have been conventionally used for a cover culture such as a plastics greenhouse, a plastics tunnel, or a greenhouse culture have heat-retaining properties at night, but are liable to create excessive moisture and thereby cause waterdrops to drop. Excessive moisture and the subsequent dropping of waterdrops not only deteriorate the working environment of a plastics house or greenhouse but also cause the plants being cultured to become diseased and a reduction in the yield and quality of the plants, with the result that the gains become poor.

On the other hand, when a nonwoven fabric having a relatively thin thickness is used, as the covering material, excessive moisture can be avoided because of the gas permeability, but satisfactory heat-retaining properties cannot be obtained and the dropping of waterdrops cannot be eliminated to a satisfactory degree. Therefore, it is considered that laminates composed of plastic films and fibrous sheets such as nonwoven fabrics are utilized. However, the use of conventional plastic films for such laminates does not lead to the avoidance of the formation of excessive moisture.

In view of the above-mentioned situations, there is proposed a laminate comprising a film of polyvinyl alcohol (hereinafter referred to as PVA) having a high hydrophilicity and hygroscopicity and excellent weathering resistance and a nonwoven fabric which are integrally laminated to each other (see Japanese Unexamined Patent Publication (Kokai) No. 56-67251). It has been established that the laminate described in the above-mentioned publication is extremely effective for avoiding the formation of excessive moisture and for preventing the dropping of waterdrops while retaining the heat-retaining properties, when it is used for a cover culture such as a plastics greenhouse, a plastics tunnel or a greenhouse culture. However, especially when the inside of a heated plastics house or a greenhouse is lined with the above-mentioned laminate, waterdrops on the ceiling, which is made of a plastics film for a plastics greenhouse or of a glass sheet, an acrylic sheet, or a polyester sheet for a greenhouse drop at a higher rate than the rate of the water-absorbing diffusion of the upper PVA film of the laminate during winter nights, especially before daybreak. As a result, the surface of the PVA film is saturated with water. In a case where puddles are locally formed on the PVA film surface, the water temperature rises due to the subsequent sunlight irradiation in the morning causing a phenomenon in which an extremely small amount of PVA is dissolved in the water. If such a phenomenon is repeated over a long period of use, the laminate becomes thinner and the so-called strength is lowered.

In order to improve the mechanical strength of the above-mentioned laminate and the lining workability in a plastics house or a greenhouse, it is necessary to impart flexibility to the laminate. If hydrophilic flexibilizers such as glycerol and glycols are added to the PVA film of the laminate to impart flexibility thereto, the hydrophilic flexibilizers are dissolved in the water and the aqueous solution drops on the plants under culture. Since this aqueous solution may damage the plants, the addition of such hydrophilic flexibilizers is limited.

The present inventors discovered that if these disadvantages could be overcome, further excellent agricultural materials can be provided.

SUMMARY OF THE INVENTION

An object of the present invention is to provide a laminate capable of avoiding the formation of excessive moisture and of preventing waterdrops from dropping while keeping the heat-retaining properties when used as a sheet for a cover culture, thereby preventing the occurrence of disease in the plants under culture and any reduction in the yield and quality of the plants.

Another object of the present invention is to provide a laminate that is flexible even if it does not contain a flexibilizer such as glycerine or glycols, it can be easily covered on the inside wall or other places in a greenhouse, it is excellent in weathering resistance and water resistance, and, hence, it is capable of withstanding a long period of continuous use and undergoes no substantial reduction in mechanical strength.

A further object of the present invention is to provide a process for producing the above-mentioned laminate.

Other objects and advantages of the present invention will be apparent from the following description.

In accordance with the present invention, there is provided a water-absorbing laminate comprising a water-absorbing film and a nonwoven fabric, in which the water-absorbing film is formed by film-forming a mixture of (A) a water-soluble polymer (hereinafter, this water-soluble polymer is sometimes referred to as a carboxyl group-containing water-soluble polymer) containing, as the monomer component, at least 40 mole % of an $\alpha,\beta$-unsaturated compound containing one or two carboxyl groups or groups from which a carboxyl group can be easily derived (hereinafter, these groups are sometimes collectively referred to as carboxyl groups) and in which 5% to 50% of the carboxyl groups and/or groups from which a carboxyl group can be easily derived are in the form of a salt and (B) polyvinyl alcohol in a weight ratio (A)/(B) of not less than 1/99 to less than 1/9.

In accordance with the present invention, there is provided a process for producing a water-absorbing laminate which comprises laminating a film on a nonwoven fabric under pressure either in a hydrous and heat-softened state of the film or through an adhesive and, if necessary, heat-treating the resultant laminate, in which the film is formed by film-forming a mixture of (A) a water-soluble polymer containing, as the monomer component, at least 40 mole % of an $\alpha,\beta$-unsaturated compound containing one or two carboxyl groups or groups from which carboxyl group can be easily derived and in which 5% to 50% of the carboxyl groups and/or groups from which a carboxyl group can be easily derived are in the form of a salt, and (B) polyvinyl alcohol in a weight ratio (A)/(B) of not less than 1/99 to less than 1/9.

The nonwoven fabrics usable in the present invention include those composed of long fibers or short fibers of synthetic polymers such as polyvinyl alcohol, acetalized polyvinyl alcohol, polyolefins, polyesters, polyamides, or acrylonitrile polymers or natural fibers. Of these nonwoven fabrics, those composed of acetalized polyvinyl alcohol fibers, polypropylene fibers, polyethylene fibers, polyamide fibers, polyester fibers, and acrylic fibers are preferable. Nonwoven fabrics composed of acetalized polyvinyl alcohol fibers and polyester fibers are preferably used especially for applications requiring durability.

BRIEF DESCRIPTION OF THE DRAWING

The present invention will be better understood from the description set forth below with reference to the accompanying drawing of FIG. 1, which is a cross-sectional view of one embodiment of a laminate according to the present invention.

DESCRIPTION OF THE PREFERRED EMBODIMENTS

Figure 1:
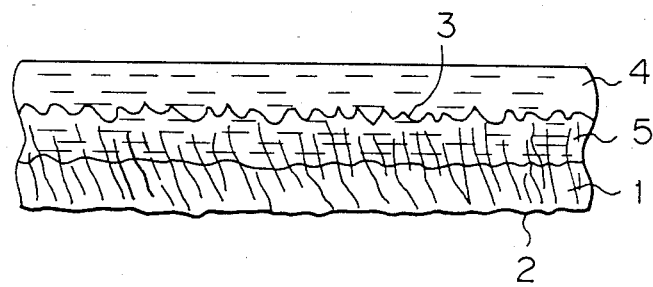
In FIG. 1, reference numerals 1, 2, 3, 4, and 5 denote a nonwoven fabric, the heat-treated surface thereof, the fibrous rough surface opposite to the heat-treated surface, a water-absorbing film layer produced from a mixture of polyvinyl alcohol and a carboxyl groups-containing water-soluble polymer, and a layer in which the water-absorbing film and the nonwoven fabric are integrally entangled with each other, respectively.

The nonwoven fabric is a bulky sheet in which a plurality of long or short fiber layers are superposed on each other or long or short fibers are entangled with each other to form a three dimensional structure. Since the nonwoven fabric includes a large amount of air therein, it is excellent in heat-retaining properties. The nonwoven fabric is preferably composed of a more bulky fibrous sheet in the form of a stack. When a heat treatment processing, for example, a heat embossing processing using a heated metal roll, especially spot bonding, is applied to one or both surfaces of such a stack-like fibrous sheet, the mechanical strength of the sheet is improved and fluffing thereof is suppressed.

The polyvinyl alcohol (B) usable for the production of the water-absorbing film of the present invention is preferably one produced by saponifying a plastics acetate homopolymer or plastics acetate copolymers containing a small amount of other copolymerizable $\alpha,\beta$-unsaturated compounds such as ethylene, plastics fluoride, plastics chloride, styrene, methyl methacrylate, maleic acid, itaconic acid, and fumalic acid in a conventional procedure. The degree of saponification is preferably 95% or more. The average polymerization degree of the polyvinyl alcohol is preferably 1000 or more.

The water-soluble polymer (A) (hereinafter, this water-soluble polymer is, sometimes, referred to as a carboxyl group-containing polymer) containing, as the monomer component, at least 40 mole % of an $\alpha,\beta$-unsaturated compound containing one or two of the carboxyl groups (hereinafter referred to as "an $\alpha,\beta$-unsaturated compound") and in which 5% to 50% of the carboxyl groups are in the form of a salt as a result of neutralization with a basic compound. This water-soluble polymer is described, together with a process therefor, in, for example, Japanese Unexamined Patent Publication (Kokai) Nos. 57-73007, 58-18256, and 58-84804.

The $\alpha,\beta$-unsaturated compounds include, for example, unsaturated monocarboxylic acids such as acrylic acid, methacrylic acid, and crotonic acid and esters and amides thereof; unsaturated dicarboxylic acids such as maleic acid and fumaric acid, and anhydrides, monoesters, diesters, monoamides, diamides, and imides thereof.

The $\alpha,\beta$-unsaturated compound may be used in combination with other copolymerizable monomer components as long as the properties required of the water-absorbing film and, further, the water-absorbing laminate are not impaired. The other copolymerizable monomers include $\alpha$-olefins such as ethylene, propylene, isobutylene, 1-butene, and diisobutylene; aromatic plastics compounds such as styrene and methylstyrene; plastics ethers such as methyl plastics ether; plastics esters such as plastics acetate and plastics propionate; and (metha)acrylonitrile; and halogenated plastics compounds such as plastics chloride. When used in combination with these other copolymerizable monomers, the $\alpha,\beta$-unsaturated compound is preferably in an amount of at least 40 mole %, more preferably at least 50 mole %, based on the total monomer components.

Preferable examples of the carboxyl group-containing copolymers are polymers of unsaturated monocarboxylic acids such as acrylic acid and methacrylic acid; $\alpha$-olefin-maleic acid (or anhydride) copolymers; styrenemaleic acid (or anhydride) copolymers; and methyl plastics ether-maleic acid (or anhydride) copolymers. Among these, alternating copolymers of maleic acid (or anhydride) with ethylene, propylene, isobutylene, styrene, or methyl plastics ether, in which the maleic acid (or anhydride) component is about 50 mole %, for example, isobutylene-maleic acid (or anhydride) alternating copolymers, are especially preferable.

The carboxyl group-containing polymers can be prepared by any conventional methods using a radical polymerization catalyst. Although the degree of polymerization of the carboxyl group-containing polymer is not especially limited, it is preferably in the range of from 100 to 10000, more preferably, from 400 to 5000.

In the carboxyl group-containing polymer, it is necessary that 5% to 50% of the carboxyl groups in the polymer should be converted to the form of a salt by a neutralization reaction with basic compounds such as alkali metal compounds and alkaline earth metal compounds. If the degree of neutralization of the carboxyl groups is too high, the partially neutralized product of the carboxyl group-containing polymer is incompatible with the PVA, and separation of the PVA from the partially neutralized product occurs during the film-forming procedure, with the result that a transparent film cannot be obtained. Furthermore, the crosslinking reaction between the PVA and the partially neutralized product of the carboxyl group-containing polymer is remarkably suppressed, with the result that the polymer is liable to be dissolved in the water from the resultant film. Even if such a film is laminated on the nonwoven fabric, the resultant laminate is not at all different from the conventional laminate of the PVA and nonwoven fabric. On the other hand, if the neutralization degree of the carboxyl groups is too low, a mixture of such a neutralized product and the PVA cannot produce a film having a satisfactory water-absorbing property. Therefore, integral lamination of this neutralized product with the nonwoven fabrics results in no laminate having an excellent water-absorbing property. For these reasons, it is preferable that 20% to 50% of the carboxyl groups in the carboxyl group-containing polymer are neutralized.

The water-absorbing film is produced by mixing the PVA with the carboxyl group-containing water-soluble polymer (A), subjecting the resultant mixture to a film-forming procedure, and, if necessary, drying the resultant film and, further, heat-treating the dried film.

The PVA and the carboxyl group-containing water-soluble polymer (A) are preferably mixed in the form of an aqueous solution. It is preferable that the solid concentration in an aqueous solution mixture of the PVA and the carboxyl group-containing water-soluble polymer (A) is in the range of from 5% to 60% by weight, more preferably from 10% to 50% by weight.

The mixing proportions of the polyvinyl alcohol (B) and the carboxyl group-containing water-soluble polymer (A) should be in the range of from not less than 1/99 to less than 1/9 in terms of the weight ratio of (A)/(B). The above-mentioned mixing proportions are more preferably in the range of from 4/96 to 9/91 in terms of the weight ratio of (A)/(B). These preferable proportions will produce a water-absorbing film having an excellent water-absorbing property, a high flexibility, a high weathering resistance, and a satisfactory mechanical strength.

The film formation is preferably carried out by casting. More specifically, as the film-forming method, there can be mentioned a method in which an aqueous solution mixture of the PVA and the carboxyl group-containing water-soluble polymer is cast in the form of a thin film on a rotary drying roll or a belt of a belt-drying furnace through a slit, and a method in which the above-mentioned aqueous solution mixture is applied to a roll coater. By using these film-forming methods, a hydrous film is obtained. If necessary, the hydrous film may be dried. If the resultant film is allowed to stand as it is, crosslinking occurs to some degree between the PVA and the carboxyl group-containing water-soluble polymer. It is preferable, however, that the crosslinking be promoted by heat treatment or the like. The heat treatment for crosslinking is preferably carried out by using at least one pair of heated rolls. The heat treatment conditions comprise, appropriately, a temperature of 110° C. to 190° C. and a time of 30 to 5 seconds, preferably a temperature of 140° C. to 170° C. and a time of 20 to 5 seconds. The water-absorbing film thus obtained is insoluble even in boiling water due to the presence of crosslinkages between the PVA and the carboxyl group-containing water-soluble polymer. Furthermore, because the moisture absorbed by the carboxyl groups in the form of an alkali metal salt is included in the net structure of the polymer of the film, the film is characterized by a high equilibrium moisture regain and water absorption (see the Reference Example described hereinafter).

That is, since the water-absorbing film of the present invention has a higher indoor equilibrium moisture regain than that of a film made of PVA alone, the present water-absorbing film is flexible. Furthermore, if an operation in which the water-absorbing film is immersed in water to cause it to absorb water and the water-absorbed film is removed from the water and dried is repeated, no reduction in the weight of the film due to the dissolution thereof occurs, and, therefore, the strength of the film is not decreased for any length of time. For these reasons, the water-absorbing film of the present invention has advantageous characteristics in that the handling properties and workability are excellent and the toughness is sufficiently high that the film cannot be easily broken. In addition, since the water-absorbing film of the present invention has a higher water vapor permeability than that of a film made of PVA alone, it is extremely effective for preventing excessive humidification and waterdrops from dropping within cover culture facilities. Furthermore, since the water-absorbing film of the present invention exhibits an extremely low permeability to gases other than water vapor, when the film is laminated with a nonwoven fabric, it is very effective for realizing the excellent heat-retaining properties of the resultant laminate in cooperation with the presence of the fiber layers of the nonwoven fabric.

In accordance with the present invention, it is preferable that the water-absorbing capacity of the water-absorbing film be adjusted to less than 1000%, more preferably within a range of from 50% to 800%, in terms of the weight percentage of water absorbed by the film based on the weight (absolute dry weight) of the film itself (this weight percentage is hereinafter referred to as a degree of water swelling). Also, it is preferable that the water-absorbing capacity of the water-absorbing film is adjusted so that the equilibrium moisture regain at a temperature of 20° C. and a relative humidity of 65% is greater than that of the PVA used for the water-absorbing film and less than 20%.

A preferable process for producing the water-absorbing laminate according to the present invention comprises superimposing the nonwoven fabric and the water-absorbing film each other and bonding the superimposed layers under pressure in such a manner that the nonwoven fabric layer and the water-absorbing film layer are entangled with each other to form an integral layer. More specifically, there is preferably used a method comprising bonding the water-absorbing film and the nonwoven fabric by means of at least one pair of press rolls while the film is in a hydrous, heat-softened state immediately after the casting, film-forming step. In this case, the pressure is preferably adjusted so that one surface of the nonwoven fabric forms one surface of the laminate and one surface of the water-absorbing film forms the other surface of the laminate and that the water-absorbing film layer is included in the nonwoven fabric. Then, the laminate is dried on a roll or a belt, after which it is continuously allowed to travel through at least one pair of heat-treating rolls so as to heat-treat it at a temperature of 110° C. to 190° C. for 30 to 5 seconds, preferably at a temperature of 140° C. to 170° C. for 20 to 10 seconds, whereby the nonwoven fabric and the water-absorbing film are integrally laminated with each other. Alternatively, water is previously added to the water-absorbing film obtained after the film-forming and drying procedures, followed by heating, or one surface of the water-absorbing film is allowed to swell by being sprayed with warm water or heated water vapor, or the water-absorbing film is coated with an aqueous adhesive. Then, the resultant water-absorbing film is integrally bonded to the nonwoven fabric under pressure, after which the film side of the laminate is subjected to heat treatment so as to produce the water-absorbing laminate.

Another example of the production process comprises bonding the nonwoven fabric to the water-absorbing film, which has been dried after the film-forming procedure and further heat-treated under pressure through an adhesive, e.g., a solution of an isocyanate-type adhesive, so as to provide an integral laminate.

FIG. 1 illustrates a cross-sectional view of a water-absorbing laminate according to the present invention. As is shown in the drawing, a layer of a water-absorbing film 4 integrally laminated on a fibrous rough surface 3 of a nonwoven fabric 1 opposite to a heat-treated surface 1 of the fabric penetrates into the fiber layers by approximately half the thickness of the nonwoven fabric as a result of the press bonding at a pressure slightly higher than that of spontaneous contact. Therefore, the nonwoven fabric and the water-absorbing film are firmly bonded to each other, and, at the same time, the fiber layers which do not participate in this bonding serve as air-containing layers to enhance the heat-retaining properties of the laminate. If a higher pressure is used during the press bonding procedure, it is possible to obtain a laminate in which the water-absorbing film layer penetrates into the nonwoven fabric throughout the full thickness thereof.

The water-absorbing laminate of the present invention is extremely effective for preventing the water-drops from dropping and excessive humidification and for suppressing the occurrence of disease in the plants being cultured, while the heat retaining properties are retained. Furthermore, since the weathering resistance of the laminate is substantially the same as that of PVA, the laminate is able to withstand well a long period of outdoor use. Therefore, by utilizing effectively these characteristics, the water-absorbing laminate of the present invention can be used as a sheet for a cover culture such as plastics greenhouse, plastics tunnel, or greenhouse culture.

In the case where the water-absorbing laminate of the present invention is used as a sheet for a plastics greenhouse, it can be naturally used singly. However, if the plastics greenhouse is provided with a double-covering therein, that is, the exterior conventional plastic film and the interior water-absorbing laminate of the present invention which are placed at a small distance from each other so as to doubly cover the greenhouse, outstanding effects can be attained with respect to the heat-retaining properties and the prevention of excessive humidification and the dropping of waterdrops.

Furthermore, the water-absorbing laminate of the present invention can be effectively used as a substrate for a hot or cold compress, as a separating membrane such as a dialysis membrane, in the field of chemistry, as a liner for preventing moisture condensation on the inner wall of a container, as a container liner for retaining the freshness of perishable foods after being preliminarily impregnated with water, and as wallpaper for preventing moisture condensation.

When the water-absorbing laminate of the present invention is used for the above mentioned purposes, if the basic weight of the nonwoven fabric is from 20 to 60 g/m$^2$, preferably from 25 to 50 g/m$^2$, and the thickness of the water-absorbing film is from 10 to 75 μm, preferably from 20 to 60 μm, the best effects are obtained.

EXAMPLES

The present invention will now be illustrated in detail by, but is by no means limited to, the following Examples.

Reference Example

Preparation and Performance Evaluation of Water-Absorbing Film

PVA having an average polymerization degree of 1700 and which was completely saponified was used to prepare an aqueous solution (I) having a concentration of 23% by weight. Separately, an isobutylene-maleic anhydride alternating copolymer having an average polymerization degree of 1000 was dissolved in an aqueous solution containing sodium hydroxide in an amount necessary to convert 45% of the carboxyl groups present in the form of an acid anhydride in the copolymer to sodium carboxylate, so as to prepare an aqueous solution (II) containing 23% by weight of an isobutylene-maleic acid-sodium maleate copolymer. The above-mentioned aqueous solutions (I) and (II) were mixed in the compounding ratio listed in Table 1. The resultant aqueous solution was extruded in the form of a film on 2a heated roll through a slit. The resultant film was heat-treated at the heat-treating temperature listed in Table 1 for 10 seconds.

The film thus obtained and a film made of PVA alone, which was prepared in the same manner as mentioned above, except that the aqueous solution (II) was not used, were measured for the degree of water swelling and equilibrium moisture regain at a temperature of 20° C. and a relative humidity of 65% or 90%. The results are shown in Table 1.

TABLE 1

| Compounding ratio at the time of film formation | | Heat treating temperature (°C.) | Degree of water swelling[2] (water absorption) (%) | Equilibrium moisture regain[3] 20° C., 65% RH (%) |
|---|---|---|---|---|
| PVA (wt. %) | Copolymer[1] (wt. %) | | | |
| 91 | 9 | 150 | 182 | 10.0 |
| | | 160 | 138 | 9.8 (23.6) |
| | | 170 | 115 | 9.7 |
| 95 | 5 | 150 | 107 | 8.3 |
| | | 160 | 88 | 7.8 (19.0) |
| | | 170 | 70 | 7.6 |
| 100 | 0 | 150 | 53 | 5.2 |
| | | 160 | 42 | 4.6 (13.8) |
| | | 170 | 32 | 4.5 |

[1]The copolymer was an isobutylene-maleic acid-sodium maleate copolymer.
[2]The degree of water swelling (%) was determined as follows. The sample (5 cm × 6 cm) was immersed in well water at 20° C. for 30 minutes. The water-impregnated sample was spread on a glass plate. Then, water attached to both surfaces of the sample was thoroughly removed with filter paper. Then, the sample was placed in a steelyard to measure the weight (W$_1$) of the water-absorbed sample. Thereafter, the sample was completely dried at 110° C. for 5 hours and the absolute dry weight (W$_2$) of the sample was measured. The degree of water swelling was calculated according to the equation: $\frac{W_1 - W_2}{W_2} \times 100$
[3]The equilibrium moisture regain refers to the moisture content of the sample after it was moisture-conditioned in a thermostat at a temperature of 20° C. and a relative humidity of 65% for 24 hours. The figures in parentheses indicate the moisture content of the sample after it was moisture-conditioned in a thermostat at a temperature of 20° C. and a relative humidity of 90%. Both of the equilibrium moisture regains were calculated based on the absolute-dry sample.

It is apparent from Table 1 that, as compared with the film made of 100% PVA, the degree of water swelling and equilibrium moisture regain of the film obtained from a mixture of the PVA and the isobutylene-maleic acid-sodium maleate copolymer increased as the compounding proportion of the copolymer was increased.

Example

Structure, Performance Evaluation and Concrete Usage of Water-Absorbing Laminate Two types of polyesters having different melting points were mixed. By using this mixture, a nonwoven fabric composed of polyester continuous fibers having a denier of 3 and having a basic weight of 30 g/m$^2$ was produced according to a spun bond method. The nonwoven fabric was passed between an embossing roll heated to 180° C. and a nylon roll to subject one surface of the nonwoven fabric to spot bonding, thereby producing a nonwoven fabric in which the occurrence of fluffs was suppressed.

On the other hand, an aqueous solution containing 23% by weight of PVA having an average degree of polymerization of 1700 and which was completely saponified and an aqueous solution containing 23% by weight of an isobutylene-maleic acid-sodium maleate copolymer, which aqueous solution was prepared by dissolving an isobutylene-maleic anhydride alternating copolymer having an average polymerization degree of 1000 in an aqueous solution containing sodium hydroxide in an amount necessary to convert 45% of the carboxyl groups present in the form of an acid anhydride in the copolymer to sodium carboxylate, were mixed in a weight ratio of 91:9. The resultant aqueous solution was extruded in the form of a film on a heated roll through a slit and the above-mentioned nonwoven fabric was superimposed on the film with the fibrous rough surface not heat-treated facing the film and the the superposed layers were lightly pressed with a roll to form a laminate, after which the laminate was dried by blowing hot air thereagainst and by means of the heated roll. Thereafter, the laminate was passed through at least one pair of heat-treating rolls at 160° C. where it was heat treated for 10 seconds. The resultant laminate was such that one surface of the nonwoven fabric was subjected to embossing processing, and the other surface thereof was laminated with the water-absorbing film layer composed of the PVA-(isobutylene-maleic acid-sodium maleate copolymer) crosslinked product at a proportion of 30 g/m² in such a manner that the film layer penetrated into the interstices between the fibers. The laminate was then subjected to a post-embossing treatment by passing it through a gap between an embossing roll heated to 130° C. and an embossed paper roll. Subsequently, water vapor was blown against both surfaces of the laminate to moisten it to an appropriate degree, thereby finishing it to a flexible state.

The laminate of the present invention thus obtained was moisture-conditioned in a room having a temperature of 20° C. and a relative humidity of 65% for 24 hours. Thereafter, the tensile strength and the elongation of the laminate were determined and were found to be 2.1 kg/10 mm in width and 29%, respectively, in the longitudinal direction and 1.1 kg/10 mm in width and 38%, respectively, in the transverse direction.

The water-absorbing laminate of the present invention and a laminate comprising a nonwoven fabric made of continuous long fibers of polyester and having a basic weight of 30 g/m², which nonwoven fabric was produced in the same manner as mentioned above, and a film made of polyvinyl alcohol alone which was laminated on one surface of the nonwoven fabric at a proportion of 30 g/m² in the same manner as mentioned above, were tested for water-absorbing properties and water resistance properties. The results are shown in Table 2.

TABLE 2

|  | Laminate of present invention | PVA film/Nonwoven fabric laminate |
|---|---|---|
| Degree of water swelling (%)[1] | 150 | 110 |
| Degree of water retention[1] A (%) | 390 | 260 |
| B (g/m²) | 220 | 150 |
| Equilibrium moisture regain | 4.8 | 3.7 |

TABLE 2-continued

|  | Laminate of present invention | PVA film/Nonwoven fabric laminate |
|---|---|---|
| 20° C., 65% RH (%) Weight loss due to boiling[2] | 5.0 | 52.0 |
| Appearance of laminate after boiling[3] | The film was swollen, but the laminate was not broken. | The film was dissolved and only the nonwoven fabric remained. |

[1] The degree of water retention A was determined as follows. That is, the laminate sample was immersed in water at 20° C. for one hour and the water-impregnated sample was hung in a thermostat at a temperature of 20° C. and a relative humidity of 65% for one hour to cause the attached water to spontaneously drop off. At the end of that time, the water content in the sample was determined. The degree of water retention A was represented by this water content. The degree of water retention B was represented by the weight of the absorbed water per unit area after the above-mentioned test.
[2] The weight loss due to boiling indicated the percentage of the weight loss of the sample, based on its original weight, after the sample was placed in boiling water at 100° C. for 30 minutes.
[3] The boiling conditions were the same as in (3) above.

Next, the above-mentioned two types of laminates and a commercially available plastics chloride-vinyl acetate copolymer film were subjected to measurement of the water vapor permeability in a thermostat at a temperature 40° C. and a relative humidity of 90% according to the cup method of JIS Z0208. The results shown in the following table were obtained.

TABLE 3

| Material | Water vapor permeability (g/m²/day) |
|---|---|
| Laminate of present invention | 4,000 |
| PVA film/nonwoven fabric laminate | 2,000 |
| Plastics chloride-vinyl acetate copolymer film (0.03 mm thick) | 200 |

It is apparent from the results shown in Table 3 that the laminate of the present invention has a higher water vapor permeability than that of the PVA film/nonwoven fabric laminate.

When the water-absorbing laminate of the present invention was used as a liner for a plastics greenhouse for a plant culture with the nonwoven fabric side being positioned inside, no temperature difference was produced within the greenhouse, and neither haze nor excessive humidification was observed at a relative humidity of 85%, as compared with a plastics greenhouse lined with a plastics chloride-vinyl acetate copolymer film. Furthermore, even when puddles were formed on the laminate of the present invention, they never dropped as waterdrops on the plants under culture. In addition, the works within the greenhouse could be comfortably carried out.

We claim:

1. A water-absorbing laminate comprising a water-absorbing film and a nonwoven fabric, said water-absorbing film being formed by film-forming a mixture of (A) a water-soluble polymer containing, as the monomer component, at least 40 mole % of an $\alpha,\beta$-unsaturated compound containing one or two carboxyl groups or groups from which a carboxyl group can be easily derived and in which 5% to 50% of the carboxyl groups and/or groups from which a carboxyl group can be easily derived are in the form of a salt, and (B) polyvinyl alcohol in a weight ratio of (A)/(B) of not less than 1/99 to less than 1/9.

2. A laminate according to claim 1, wherein the water-soluble polymer (A) is an α-olefin-maleic acid-alkali metal maleate copolymer.

3. A laminate according to claim 1, wherein the nonwoven fabric is a nonwoven fabric composed of long or short fibers made of polyvinyl alcohol, acetalized polyvinyl alcohol, polyolefins, polyesters, polyamides, or acrylonitrile-type polymers or natural fiber.

4. A laminate according to claim 1, wherein the water-absorbing laminate is a sheet for a cover culture.

5. A process for producing a water-absorbing laminate which comprises laminating a film on a nonwoven fabric under pressure either in a hydrous and heat-softened state of the film or through an adhesive and, optionally, heat-treating the resultant laminate, said film being formed by film-forming a mixture of (A) a water-soluble polymer containing, as the monomer component, at least 40 mole % of an α,β-unsaturated compound containing one or two carboxyl groups or groups from which a carboxyl group can be easily derived and in which 5% to 50% of the carboxyl groups and/or groups from which a carboxyl group can be easily derived are in the form of a salt, and (B) polyvinyl alcohol in a weight ratio (A)/(B) of not less than 1/99 to less than 1/9.

6. A process according to claim 5, wherein a film material in a hydrous and heat-softened state, which has been cast from an aqueous solution mixture of the water-soluble polymer (A) and the polyvinyl alcohol (B), is bonded to one surface of the nonwoven fabric under pressure and the laminate is then dried and heat-treated.

7. A process according to claim 6, wherein the cast film material in a hydrous and heat-softened state is a hydrous film immediately after casting.

8. A process according to claim 6, wherein the cast film material in a hydrous and heat-softened state is one obtained by adding water to a film which has been preliminarily dried after the casting and heating thereof or blowing heated water vapor against such a film.

* * * * *